US007005100B2

(12) United States Patent
Lowell

(10) Patent No.: US 7,005,100 B2
(45) Date of Patent: Feb. 28, 2006

(54) METHOD FOR MANUFACTURING A POTTED BUNDLE OF HOLLOW FIBERS

(75) Inventor: Paul Lowell, Wilmington, MA (US)

(73) Assignee: Millipore Corporation, Billerica, MA (US)

( * ) Notice: Subject to any disclaimer, the term of this patent is extended or adjusted under 35 U.S.C. 154(b) by 324 days.

(21) Appl. No.: 10/130,331

(22) PCT Filed: Dec. 15, 2000

(86) PCT No.: PCT/US00/33926

§ 371 (c)(1),
(2), (4) Date: May 10, 2002

(87) PCT Pub. No.: WO01/43855

PCT Pub. Date: Jun. 21, 2001

(65) Prior Publication Data
US 2002/0171172 A1 Nov. 21, 2002

Related U.S. Application Data

(60) Provisional application No. 60/172,337, filed on Dec. 17, 1999.

(51) Int. Cl.
*B29C 65/70* (2006.01)
(52) U.S. Cl. .................. 264/263; 264/261; 264/273; 264/265; 264/267; 264/275; 264/279
(58) Field of Classification Search ............. 264/265, 264/263, 267, 273, 275, 279
See application file for complete search history.

(56) References Cited

U.S. PATENT DOCUMENTS

| 4,179,380 | A |   | 12/1979 | Amicel et al. |
|-----------|---|---|---------|---------------|
| 4,389,363 | A |   | 6/1983  | Molthop |
| 6,270,714 | B1 | * | 8/2001  | Azran et al. ............... 264/443 |
| 6,290,756 | B1 | * | 9/2001  | Macheras et al. ............. 96/8 |

FOREIGN PATENT DOCUMENTS

FR 2212166 7/1974
WO PCT/US99/30141 12/1999

OTHER PUBLICATIONS

Copy of International Search Report.
Patent Abstract of Japan, vol. 1996, No. 02, Feb. 29, 1996.

* cited by examiner

Primary Examiner—Edmund H. Lee
(74) Attorney, Agent, or Firm—Millipore Corporation

(57) ABSTRACT

The present invention involves a process that includes injecting a potting compound such as an epoxy through a hollow portion (2B) of the central mandrel (2) and onto the inner layer(s) of a multi-layered fiber bundle (3) and through the outside of the bundle and onto the outer layer(s) of the bundle. By potting through the central mandrel (2), the potting compound distributes evenly throughout the inner fibers of the bundle (3). The steps may be sequentially or simultaneously. Preferably it is done as a two-step process, with the first step being to apply the potting compound through the central mandrel (2) and onto the inner fibers first. The second step is to pot around the outer layer of the fiber bundle (3) to finish the process. The resultant product is also disclosed.

9 Claims, 5 Drawing Sheets

METHOD FOR MANUFACTURING A POTTED BUNDLE OF HOLLOW FIBERS

This application claims the benefit of Provisional App. No. 60/172,337, filed Dec. 17, 1999.

The present invention relates to a method of potting hollow fibers. More particularly, it relates to a method of potting spiral wound hollow fibers.

BACKGROUND OF THE INVENTION

Straight hollow fiber filtration devices are ubiquitous. However, coiled hollow fiber modules were only recently disclosed. See U.S. Pat. No. 5,626,758. Indeed, multi-layered coiled hollow fiber devices were only briefly discussed in U.S. Pat. No. 5,626,758, with no mention of how to assemble or pot the fiber bundles. Devices containing coiled hollow fibers if designed properly are capable of inducing Dean vortices in their inner diameter or lumen. These vortices cause a sweeping of the inner lumen surface disrupting the boundary layer which forms there between the particles or dissolved species which are to be retained inside the fiber and materials and fluids which are to pass through the fibers to the outside of the fibers, thus causing depolarization and defouling of the fiber membrane creating greater efficiency in the filtration process.

In the prior art, epoxy is typically used to pot or bond one or both of the ends of straight hollow fibers together. Such fibers are potted by injecting epoxy around the outer layer of fibers. In this way, the outer surfaces of the ends of the fibers are formed into a liquid tight seal such that all fluid must pass through the lumen of the fibers in those areas that are potted. While this method is appropriate for straight hollow fibers, it has proven inadequate for the coiled hollow fiber devices, especially the multilayered coiled hollow fiber devices produced by the inventor's colleagues. See PCT/U.S.99/30141, filed Dec. 17, 1999.

As a mandrel is preferably-used to produce these the multi-layered coiled hollow fiber devices, the mandrel interfered with the potting. With the prior art method of injecting the epoxy from the outside inward, the epoxy does not seal around all of the fibers, especially the fibers positioned at or near the mandrel. The tightly wound, multiple layers of fibers formed a barrier to the epoxy penetrating the inner layers of fibers. Since the fibers did not pot properly, the performance of the module does not match the performance outputs predicted by the algorithms.

OBJECTS OF THE INVENTION

It is an object of the present invention to pot fibers wound around a central mandrel.

It is an object of the present invention to pot fibers wound around a hollow central mandrel.

It is an object of the present invention to pot multiple layers of fibers wound around a central mandrel that is a hollow tube.

It is an object of the present invention to provide better distribution of the potting compound, especially to the inner layers of fibers in a hollow fiber bundle.

It is an object of the present invention to provide a means to use higher viscosity potting compounds such as epoxies than those previously used in the prior art.

It is an object of the present invention to prevent the potting compound from wicking up into the fibers or up the side of the mandrel.

It is an object of the present invention to provide a hollow fiber device having two or more layers of hollow fibers where at least one layer is coiled on top of the other and at least one end of the fibers is sealed by a potting material throughout the bundle.

DETAILED DESCRIPTION OF THE INVENTION

The present invention involves a process that includes injecting a potting compound such as an epoxy through a hollow portion of the central mandrel and onto the inner layer(s) of a multi-layered fiber bundle and through the outside of the bundle and onto the outer layer(s) of the bundle and the product made by it. By potting through the central mandrel, the potting compound distributes evenly throughout the inner fibers of the bundle. The steps may be sequentially or simultaneously. Preferably it is done as a two-step process, with the first step being to apply the potting compound through the central mandrel and onto the inner fibers first. The second step is to pot around the outer layer of the fiber bundle to finish the process.

The present invention is a potting technique that is preferable for potting spiral wound hollow fibers, especially when used in multiple layers. This potting technique would also be used to pot the ends of straight hollow fibers, especially in those devices having a high density of fibers or those utilizing a large number of layers of straight fibers, using a hollow mandrel that is either the length of the fibers in the bundle or by using two hollow mandrels, the length of which are only the length of the area of the fibers needed to be potted.

Figure 1:
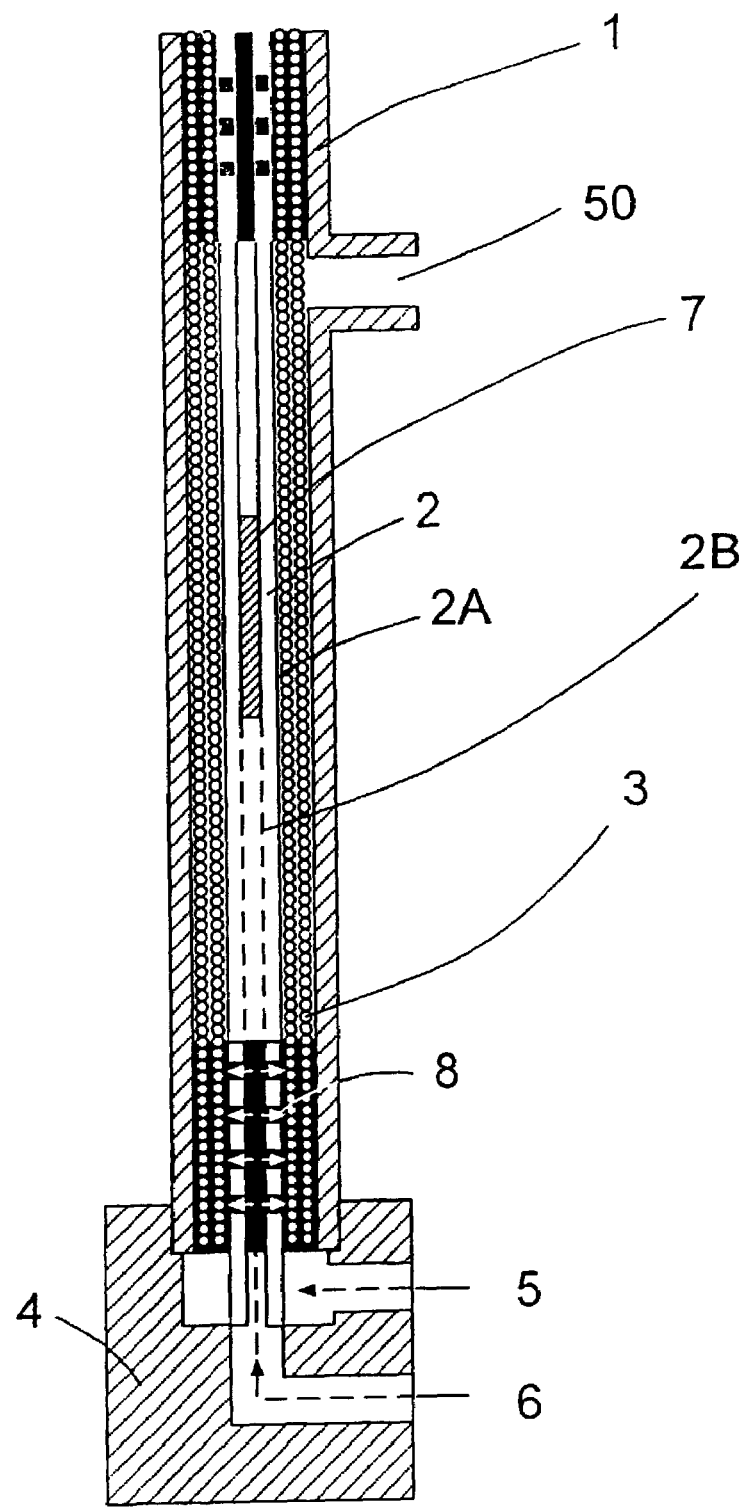
FIG. 1 illustrates a sectional view of a device used to practice the present invention.

FIG. 1 illustrates a first embodiment of the present invention. The shell or housing 1 contains a mandrel 2 having one or more layers of hollow fibers 3 wrapped around its outer surface 2A. This device is placed on a preformed block 4 that has an outer layer potting fill hole 5 and a center rod potting fill hole 6. The mandrel 2 as shown has a hollow center 2B and includes a plastic inset or plug 7 and through holes 8 in fluid communication with the inner layers of hollow fibers 3.

The structure is then inserted into the preformed block 4 and the inner layer fill hole 6 is then filled with enough potting compound such as epoxy to force the compound through the through holes 8 and into the fiber bundle to form a pot of predetermined height. The outer layer fill hole 5 is also filled with potting compound preferably to that same height. Preferably, the inner hole 6 is filled first followed by the outer hole 5 to ensure that adequate flow around all fibers is achieved. Alternatively, both may be filled simultaneously if desired.

Additionally, as shown only one block 4 is shown. If desired, two blocks could be used and the ends are potted either sequentially or simultaneously.

Figure 2:
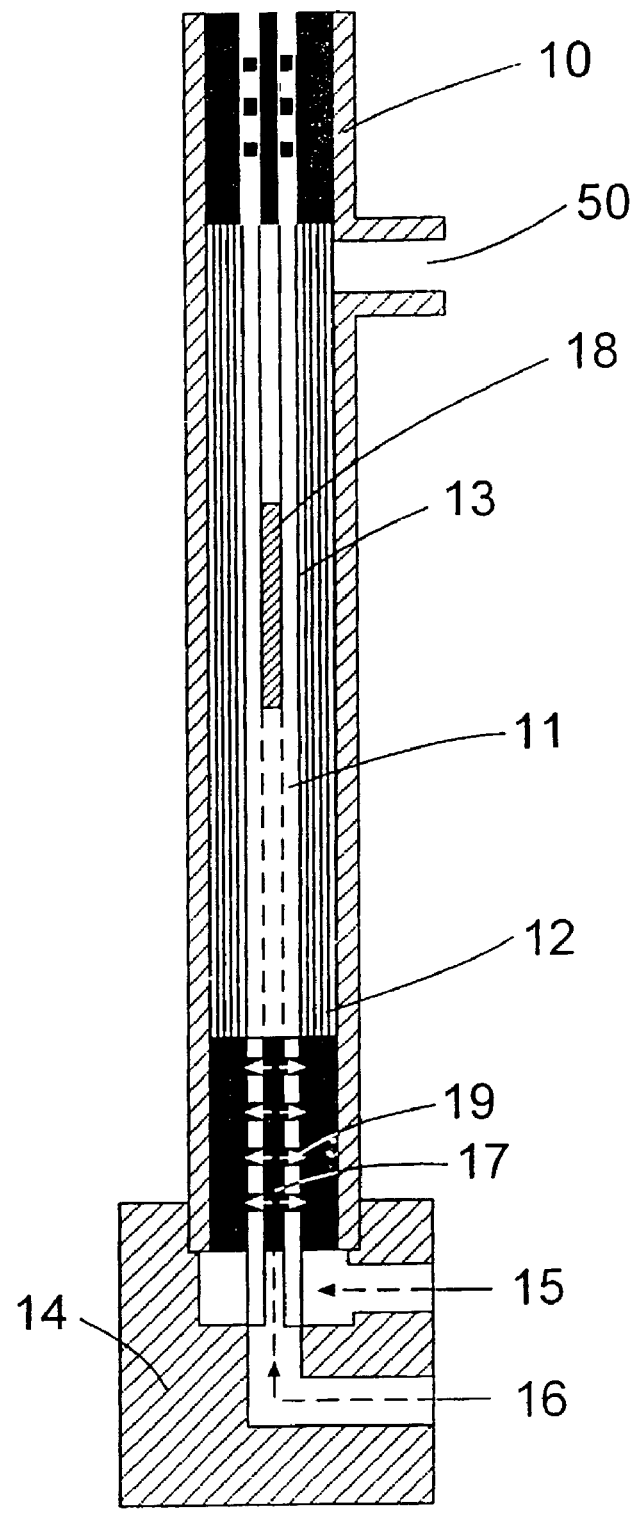
FIG. 2 illustrates a sectional view of a device used to practice the present invention.

FIG. 2 shows a second embodiment of the present invention. In this embodiment it is applied to straight hollow fibers. The shell or housing 10 contains a mandrel 11 having one or more layers of straight hollow fibers 12 surrounding the outer surface 13 of the mandrel 11. This device is placed on a preformed block 14 that has an outer layer potting fill hole 15 and a center rod potting fill hole 16. The mandrel 11 as shown has a hollow center 17 and includes a plastic inset or plug 18 and through holes 19 in fluid communication with the inner layers of hollow fibers 12.

Potting compound such as epoxy or urethane resin is then flowed into the inner layer fill hole 16 with enough potting compound to force the compound through the through holes 19 and into the fiber bundle to form a pot of predetermined height. The outer layer fill hole 15 is also filled with potting compound preferably to that same height. Preferably, the inner hole 16 is filled first followed by the outer hole 15 to ensure that adequate flow around all fibers is achieved. Alternatively, both may be filled simultaneously if desired.

Figure 3:
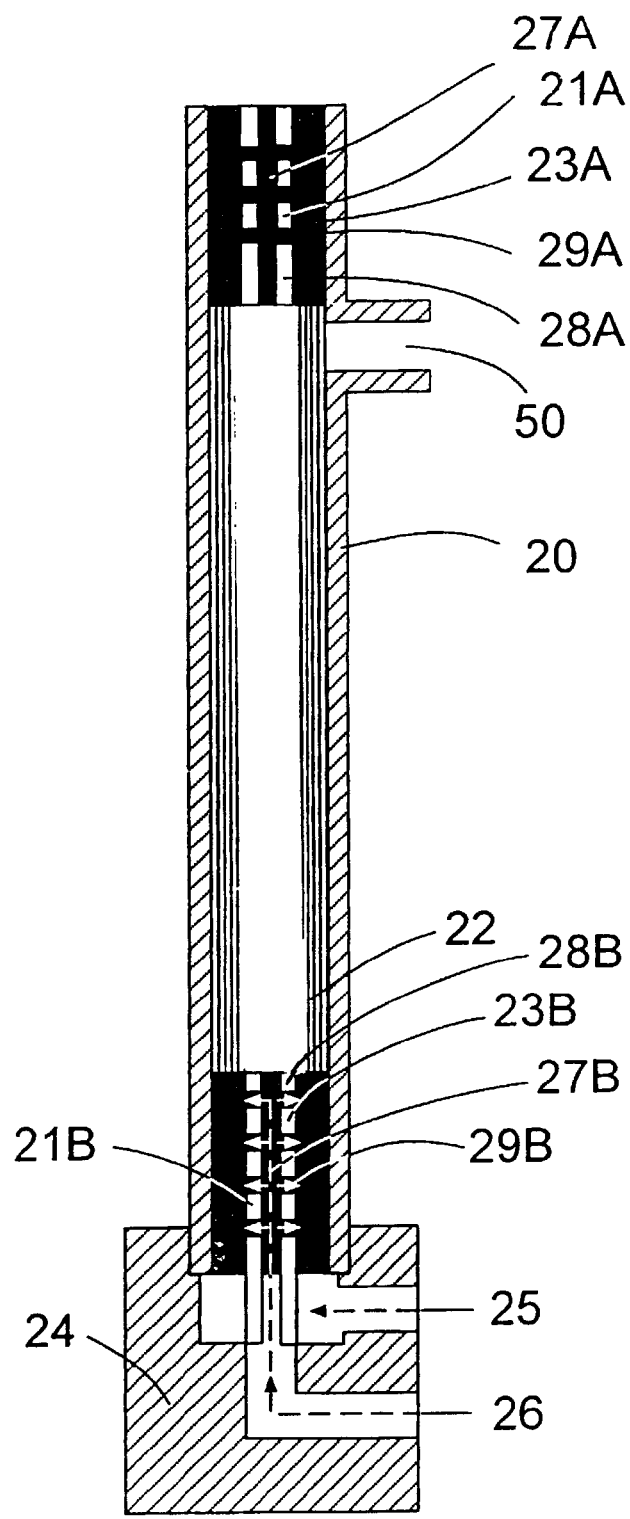
FIG. 3 illustrates a sectional view of a device used to practice the present invention.

FIG. 3 shows a third embodiment of the present invention. In this embodiment it is applied to straight hollow fibers. The shell or housing 20 contains two short mandrels 21A and B that are equal in length or slightly longer than the area or length of fiber which will be potted. Each mandrel 21A and 21B is located at opposite ends of the shell 20 and have one or more layers of straight hollow fibers 22 surrounding the outer surface 23A and 23B respectively of each mandrel 21A and 21B. This device is placed on a preformed block 24 that has an outer layer potting fill hole 25 and a center rod potting fill hole 26. The mandrels 21A and B as shown each has a hollow center 27 and includes an end cap 28A and 28B and through holes 29A and B in fluid communication with the inner layers of hollow fibers 22.

Potting compound such as epoxy or urethane resin is then flowed into the inner layer fill hole 26 with enough potting compound to force the compound through the through holes 29A and B and into the fiber bundle to form a pot of predetermined height. The outer layer fill hole 25 is also filled with potting compound preferably to that same height. Preferably, the inner hole 26 is filled first followed by the outer hole 25 to ensure that adequate flow around all fibers is achieved. Alternatively, both may be filled simultaneously if desired.

Figure 4:
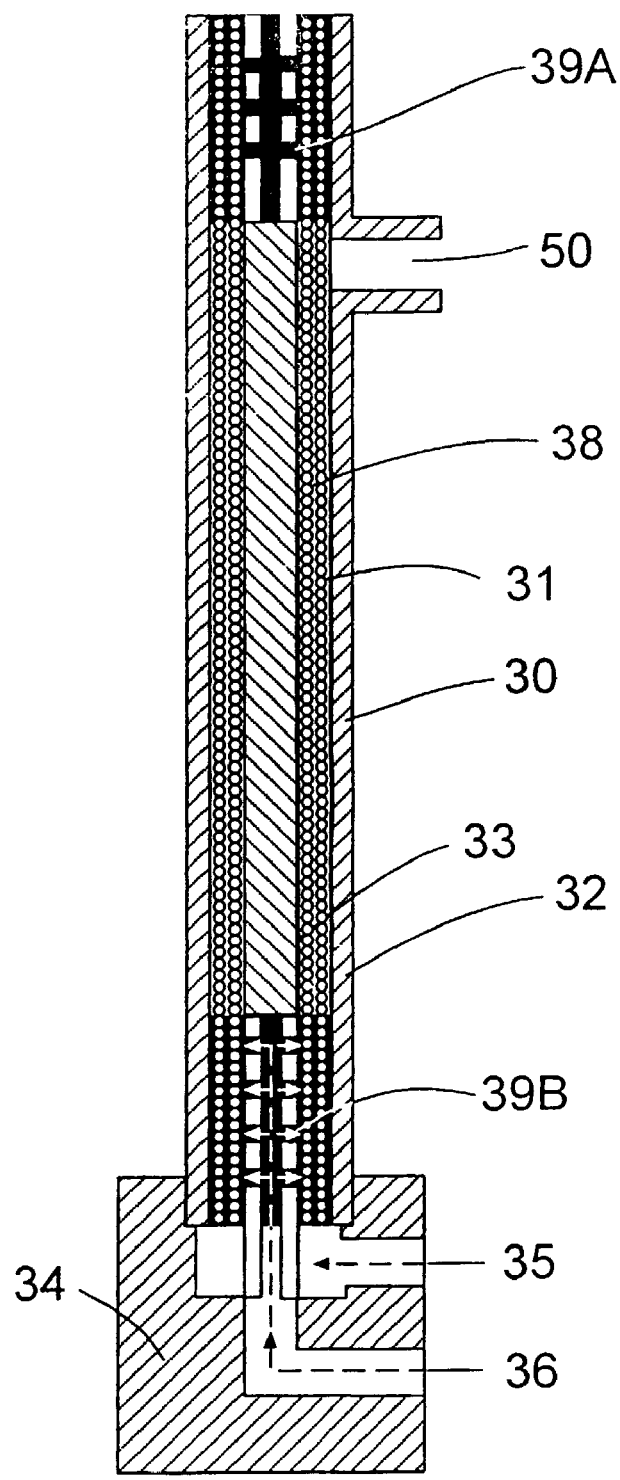
FIG. 4 illustrates a sectional view of a device used to practice the present invention.

FIG. 4 shows a further embodiment of the present invention. In this embodiment it is applied to spiral wrapped hollow fibers. The shell or housing 30 contains a mandrel 31 having one or more layers of straight hollow fibers 32 surrounding the outer surface 33 of the mandrel 31. This device is placed on a preformed block 34 that has an outer layer potting fill hole 35 and a center rod potting fill hole 36. The mandrel 31 as shown has a hollow center at each end of the mandrel and a solid center in the middle portion 38 of the mandrel 31. Through holes 39A and B are in fluid communication with the inner layers of hollow fibers 32.

Potting compound such as epoxy or urethane resin is then flowed into the inner layer fill hole 36 with enough potting compound to force the compound through the through holes 39A and B and into the fiber bundle to form a pot of predetermined height. The outer layer fill hole 35 is also filled with potting compound preferably to that same height. Preferably, the inner hole 36 is filled first followed by the outer hole 35 to ensure that adequate flow around all fibers is achieved. Alternatively, both may be filled simultaneously if desired.

Figure 5:
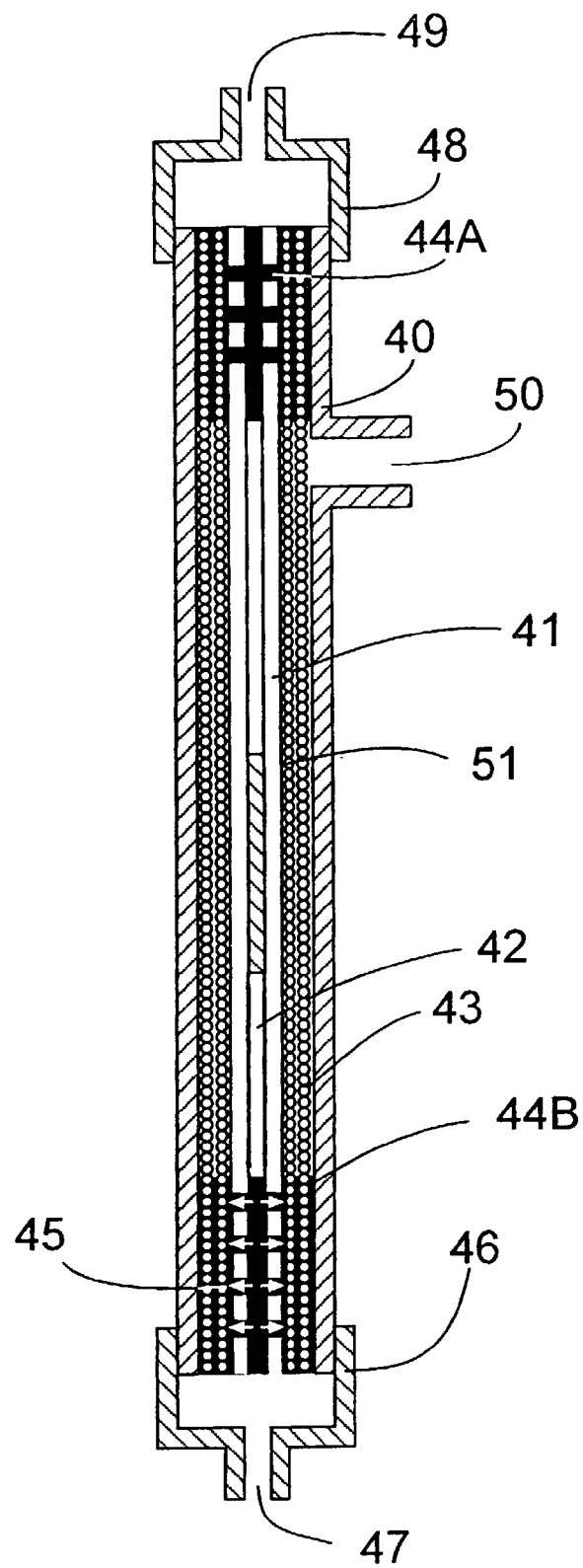
FIG. 5 illustrates a sectional view of a completed device according to one embodiment of the present invention.

FIG. 5 shows a completed hollow fiber device of FIG. 1. The shell 40 contains a mandrel 41 having one or more layers of coiled hollow fibers 43 surrounding the outer surface of the mandrel 41. The mandrel 41 as shown has a hollow center 42. Through holes 44A and B are in fluid communication with the inner layers of hollow fibers 43. The center 42, outer surfaces of the fibers 43 at each end of the device are encased in a potting material 45 so that they form a liquid tight seal and all liquid must enter the ends through the inner diameter or lumens of the fibers. One end is sealed with a cap 46 which has a port 47 for fluid into or out of the lumen side of the device. The other end as shown has a similar cap 48 with a port 49. Other configurations and designs are well known in the industry and this example is not meant to be limiting to the above design. The shell has a permeate port 50 to add or remove fluid from the space 51 created between the outside of the fiber bundle and the inner wall of the shell. If desired a second port (not shown) similar to that of the port 50 may be added to the shell 40 as well.

In practice, the fluid to be filtered would flow into port 47 into the interior of the fibers 43. Permeate (filtered liquid) would flow through the pores of the fibers to the shell space 51 and then through port 50 to further processing or use. That portion of the fluid which did not pass through the fiber would exit the module through port 49. It may be recirculated to port 47, sent further downstream or dumped to waste.

As is well known in the art one can use two shell side ports like that of port 50 and create a shell side flow which helps control the transmembrane pressure (TMP) in the device.

Preferably, prior to inserting the hollow fiber bundle into the shell, the end to be potted is preferably immersed or treated with a removable wetting agent such as glycerin (especially when used with an epoxy potting compound). The wetting agent wets the fibers such that the potting compound such as the epoxy does not wick into the lumens of the fibers or up the side of the fiber. Use of the glycerin insures the pot is reproducible, forms a liquid tight seal and eliminates issues of meniscus formation and blocking of otherwise active pores of the hollow fibers. While glycerin is cited as an example of the wetting agents that can be used, it is by no means meant to be limiting. Any other wetting agent that performs the same function and is compatible with the fibers and potting compound can be used. These will be obvious to one of ordinary skill in the art.

The potting compound of the present invention is to be introduced into the various parts of the bundle in a fluid form. These potting compounds may be thermosetting or thermoplastic. By fluid it means the material is capable of sufficient flow so as to enter the area of the bundle and surround the required layers of fibers. Typically, it is in the form of a liquid especially with thermoset materials. It may also be in molten form especially with thermoplastic materials.

Suitable potting compounds include those traditionally used in potting straight hollow fiber bundles such as epoxy resins and urethane resins. Other resins such as acrylics, methacrylics and cyanoacrylates may also be used. They may air curable, catalyst activated (palladium or silver for example), heat curable (so long as the temperature to which the resin and surrounding components are heated is less than that which distorts or destroys any component of the device), light curable, moisture curable or other well-known adhesive cure mechanisms. Thermoplastics, especially polyolefins, such as polyethylene, polypropylene or EVA copolymers, that are of a melting point lower than that of the fibers or shell may also be used. Preferably they are injection molded around the fibers through the ports of the block. The key is for the resin to be fluid enough to reach the desired layers of the bundles and then be set to seal outer surfaces of the fibers in the bundle into a liquid tight seal.

In one preferred embodiment of the present invention, one is allowed to use higher viscosity resins, especially epoxy and urethane resins than had been used in the past. This is because the resin needs only travel through half of the layers of the bundle as compared to the past and therefore there is sufficient time and one can apply sufficient pressure to the flow of potting compound to ensure that it can travel through the required layers of the bundle.

The mandrel or mandrels, depending on the embodiment chosen, may be formed of plastic, glass or metal with plastic being preferred. The material selected must be suitable for use in its intended field, such as separations of biopharmaceutical or genetically engineered materials, water purification, blood separation, milk, including transgenic milk separations, photochemical and fine chemical filtrations, and the like. It should be inert in that intended environment, allowing little if any extractables to leach from its structure into the fluid being processed. Additionally, it must be compatible with the chosen potting material.

Plastics suitable for use include but are not limited to acrylics, methacrylics, polycarbonates, epoxy resins, polystyrenes, polyvinyl chlorides, polyolefins and blends of the above. Suitable metals include but are not limited to aluminum, stainless steel, copper, brass, white metal (a lead, tin or zinc alloy or amalgam).

The invention claimed is:

1. A method for manufacturing a potted bundle of hollow fibers, the method comprising the steps of:
   (a) providing a housing comprising at least one or more layers of hollow fiber membrane provided around a hollow tube, said hollow tube having through a hole in fluid communication with said one or more layers;
   (b) inserting the housing of (a) into a preformed block comprising an inner layer fill hole in fluid communication with the hollow tube and an outer layer fill hole in fluid communication with one or more layers of the hollow fiber membrane;
   (c) introducing a fluid potting compound to said one or more layers of hollow fiber membrane by filling said inner layer fill hole with enough of said fluid potting compound to force the compound through said through hole, said fluid potting compound comprising a curable resin;
   (d) introducing said fluid potting compound to said one or more layers of hollow fiber membrane by filling said outer layer fill hole; and
   (e) curing said curable resin of (c) and (d) thereby forming said potted bundle of hollow fibers.

2. The method of claim 1, wherein said one or more layers of hollow fiber membrane is provided around two of said hollow tube, each hollow tube located at a respective end of the bundle, and each hollow tube having a length equal to or greater than a desired height of said fluid potting compound; and wherein said hollow fiber membrane comprises straight hollow fiber membrane.

3. The method of claim 1, wherein said hollow fiber membrane comprises a spirally-wound hollow fiber membrane coiled around said hollow tube with each successively outward layer overlapping the previous layer.

4. The method of claim 1, wherein steps (c) and (d) are conducted simultaneously.

5. The method of claim 1, wherein steps (c) and (d) are conducted sequentially.

6. The method of claim 1, wherein the hollow fiber membrane is treated with a wetting agent before the fluid potting compound in steps (b) or (c) is introduced.

7. The method of claim 1, wherein the hollow fiber membrane is treated with glycerin before the fluid potting compound in steps (c) and (d) is introduced.

8. The method of claim 1, wherein the hollow fiber membrane is comprised of straight hollow fibers.

9. The method of claim 1, wherein the hollow fiber membrane is comprised of spiral wrapped hollow fibers.

* * * * *